Sept. 27, 1949.  I. CISSKI ET AL  2,482,745
USED-FILM SIGNAL FOR MOTION-PICTURE CAMERAS
Filed Jan. 12, 1946  2 Sheets-Sheet 1
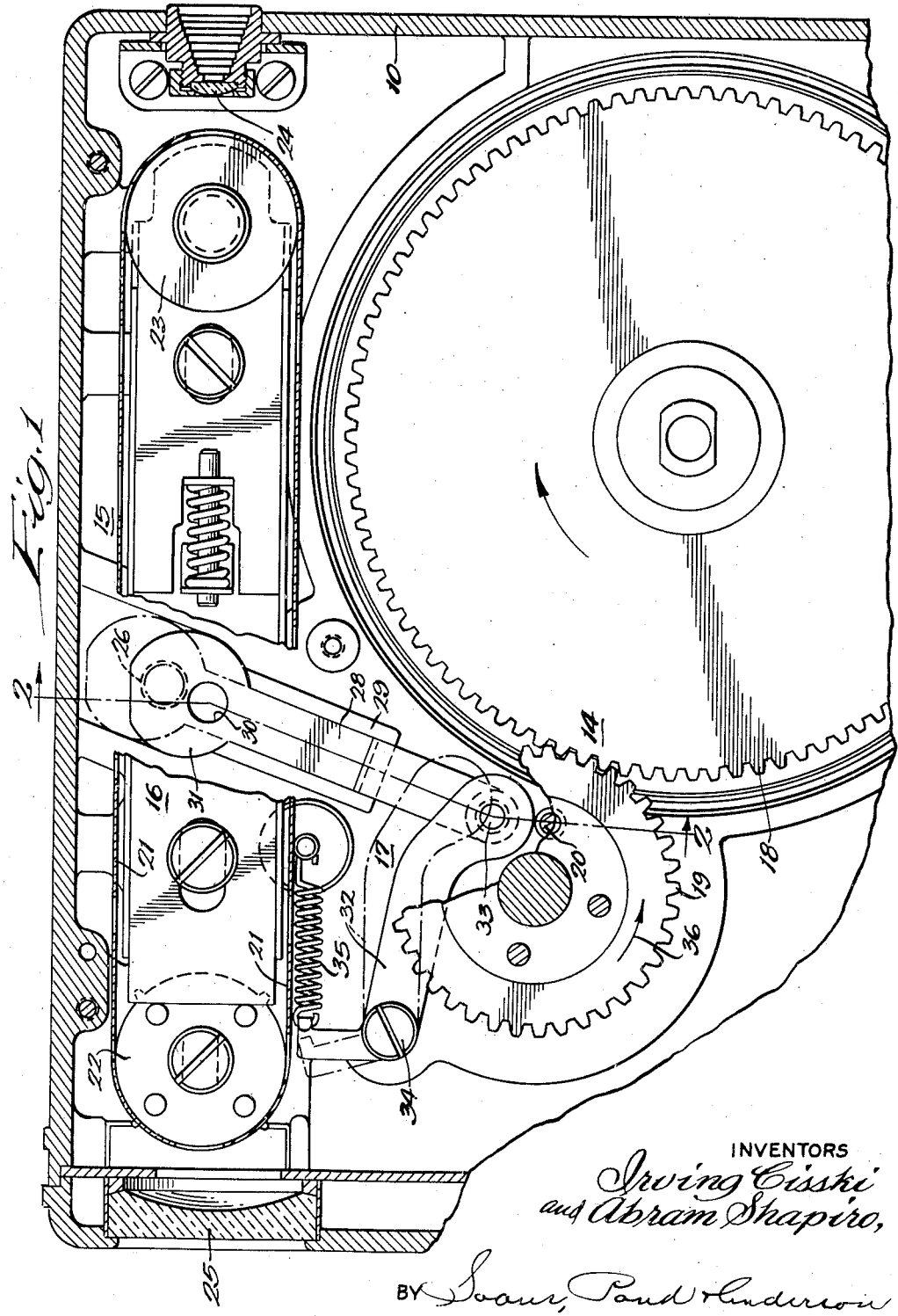
INVENTORS
Irving Cisski
and Abram Shapiro,
BY Soans, Pond & Anderson
ATTORNEYS.

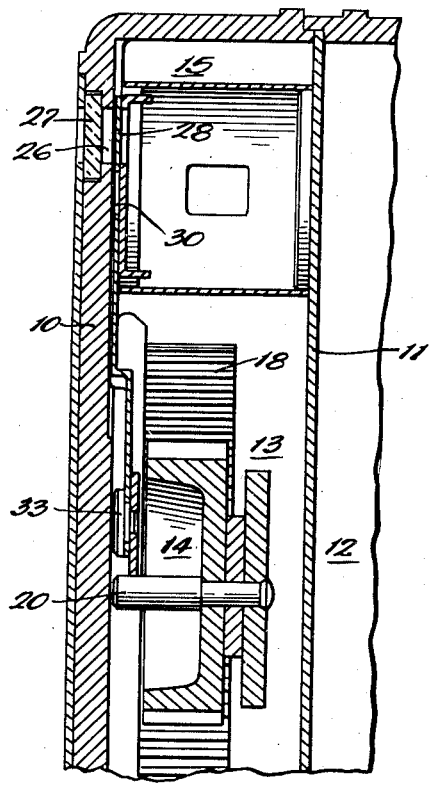
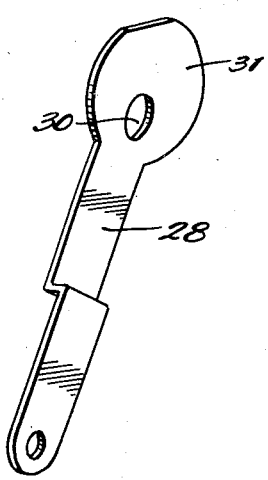

Patented Sept. 27, 1949

2,482,745

UNITED STATES PATENT OFFICE 2,482,745

USED-FILM SIGNAL FOR MOTION-PICTURE CAMERAS

Irving Cisski, Schiller Park, and Abram Shapiro, Chicago, Ill., assignors to Ampro Corporation, Chicago, Ill., a corporation of Illinois Application January 12, 1946, Serial No. 640,956

4 Claims. (Cl. 88—16)

This invention relates to used-film signals for motion picture cameras.

In the use of motion picture cameras the film is transported past the film aperture very rapidly, generally making from 8 to 64 exposures a second. Previous to taking the scene, an operator usually determines the amount of film he intends to "shoot" for that particular scene. Absorbed with the scene he envisions through the view finder, he can easily become oblivious to the amount of film that has passed or is passing the aperture. It is, therefore, desirable that some provision be made for intermittently arresting the operator's attention to the passage of certain portions of the film so that he will have reason to be aware of how much film footage remains to be taken of the previously determined amount.

The main objects of this invention, therefore, are to provide improved signal means for motion picture cameras adapted to apprize the operator, sighting through the view finder, that predetermined portions of the film are passing the film-exposure aperture; to provide an improved signal means of this kind affording the operator simultaneous visible and audible signals; and to provide an improved visible and audible signal mechanism so related to the operating mechanism that the frequency of the signals is synchronized with the variation in the speed of the film past the exposure aperture.

The preferred embodiment of this invention is shown in the accompanying drawings on an enlarged scale, in which:

Fig. 1 is a fragmentary longitudinal sectional view of a camera housing wherein has been incorporated a view-finder masking device of the type disclosed in co-pending application Serial No. 640,954, filed January 12, 1946, and with which is associated a visible and audible used-film signal constructed in accordance with this invention;

Fig. 2 is a fragmentary transverse sectional view taken on the line 2—2 of Fig. 1; and Fig. 3 is a perspective view of the shutter or semaphore by means of which a light ray is introduced into the view finder transversely of the line of vision therethrough.

A motion picture camera embodying this improved used-film signal comprises a housing 10 divided by a vertical partition 11 into a compartment 12 for the film magazine (not shown) and a compartment 13 for a motor-operated mechanism 14. The upper portion 15 of the compartment 13 houses a view-finder masking device 16, of the type disclosed in the aforesaid co-pending application, and with which is associated a used-film signal mechanism 17, constructed in accordance with this invention.

The motor-operated mechanism 14 is connected to drive a film-shutter and -transport mechanism (not shown) through the medium of a train of gears, of which the gears 18 and 19 herein shown are a part, the latter of which is provided with a pin 20 which causes the operation of the used-film signal mechanism 17, as will be more fully hereinafter pointed out.

The view-finder masking device 16 herein shown comprises, a mask band 21 arranged on rollers 22 and 23 between the view-finder eye lens 24 and objective lens 25. As fully set forth in the above co-pending application, the band 21 is shiftable so as to bring specially-formed openings in the band into an appropriate line of vision through the view-finder lenses 24 and 25.

At one side of the housing 10 is formed a light aperture or window 26, preferably covered by a glass 27, which is adapted to admit light from the outside into the chamber 15 transversely of the line of vision through the lenses 24 and 25. Such admission of light is controlled by a member or semaphore 28.

The member or semaphore 28 is slidably mounted in a grooved support 29 so that it may be reciprocated to bring an aperture 30, formed in the enlarged end 31, into and out of registration with the light aperture or window 26.

A rocker arm 32 is pivotally connected at 33 to the end of the member 28 and by means of a pivot pin 34 is mounted on the housing 10. The arm 32 is normally urged by a spring 35 to hold the inner end thereof in the path of pin 20 on the gear 19. At the same time the spring holds the member 28 in its retracted position so that the aperture 30 is out of registration with the light aperture 26, and light therethrough is restricted by means of the enlarged part 31 on the member 28.

The operation of the device herein shown is as follows:

The gear 19 is driven at a predetermined speed in the direction of the arrow 36. The remaining part of the gear train whereby the motor is connected to the film-shutter and -transport mechanism (not shown) is such that the gear 19 makes one revolution for every six inches of the film. Once each revolution of the gear 19 the pin 20 contacts the outer end of the rocker arm 32, shifting the same upwardly against the action of the spring 35 and moving the member 28 so that the aperture 30 is brought into registration with the window 26. As soon as the pin 20 passes the lower end of the rocker arm 32, the spring 35 returns the parts to the positions outlined in full lines in Fig. 1, thereby retracting the member 28 so as to move the aperture 30 out of registration with the window 26.

The speed of the gear 19 being rather rapid, the contact of the pin 20 with the end of the rocker arm 32 makes a "click" which may be heard by the operator of the camera. Concurrently, the member 28 is shifted to bring the aperture 30 into registration with the window 26. This results in a flash of light being admitted into the chamber 15 transversely of the line of vision through the lenses 24 and 25 at practically the same instant that the "click" occurs.

Therefore, an operator, using a camera with a used-film signal constructed in accordance with this invention and viewing an object through the view-finder eye and objective lenses 24 and 25 and having his fingers on the starting control for the motor mechanism, is made aware through the senses of sound and sight that an increment of six inches of film has been exposed between each of the signals caused by every contact of the pin 20 with the rocker arm 32. As a consequence the operator is made subconsciously aware of the number of feet of film that has been exposed. He can, accordingly, concentrate on securing the desired filming of the action, with which he is at the moment concerned, assured that one or both of the signals will indicate the proper moment for terminating that particular "shot."

Variations and modifications in the details of structure and arrangement of the parts may be resorted to within the spirit and coverage of the appended claims.

We claim:

1. The combination with a motion picture camera having a view finder and a gear train connecting the motor with a film-shutter and -transport mechanism mounted in the camera housing, of a window formed in said housing intermediate the eye- and objective-lenses of said view finder to admit light from the exterior of said housing to said view finder between said lenses, a member reciprocatingly mounted on said housing and movable into and out of position to permit the intermittent admission of light through said window to said view finder, and coacting means on said gear train and said member adapted to reciprocate said member during the normal operation of said motor.

2. The combination with a motion picture camera having a view finder and a gear train connecting the motor with a film-shutter and -transport mechanism mounted in the camera housing, of a window disposed transverse to the camera formed in said housing intermediate the eye- and objective-lenses of said view finder to admit light from the exterior of said housing to said view finder between said lenses, a normally retracted member reciprocatingly mounted on said housing and movable into and out of position to permit the intermittent admission of light through said window to said view finder, and means on one of the gears of said gear train movable into and out of position to engage and shift said member to effect a recurring intermittent opening and closing of said window, said member and means being so positioned that said engagement produces an audible signal coincident with the shifting of said member.

3. The combination with a motion picture camera having a view finder and a gear train connecting the motor with a film-shutter and -transport mechanism mounted in the camera housing, of a window formed in said housing intermediate the eye- and objective-lenses of said view finder to admit light from the exterior of said housing to said view finder between said lenses, an apertured shutter reciprocable into and out of position for bringing said aperture into registration with said window to cause the intermittent admission of light through said window to said view finder, resilient means normally urging said shutter into a position to locate said aperture out of registration with said window, and means on one of the gears of said gear train adapted to contact said shutter and intermittently shift it against the action of said resilient means to momentarily bring said shutter aperture into registration with said window.

4. The combination with a motion picture camera having a view finder and a gear train connecting the motor with a film-shutter and -transport mechanism mounted in the camera housing, of a window formed in said housing intermediate the eye- and objective-lenses of said view finder to admit light from the exterior of said housing to said view finder between said lenses, an apertured shutter reciprocable into and out of position for bringing said aperture into registration with said window to cause the intermittent admission of light through said window to said view finder, resilient means normally urging said shutter into a position to locate said aperture out of registration with said window, a rocker arm mounted on said housing and having one end thereof connected to said shutter, a spring normally urging said arm to shift said shutter into position to locate said aperture out of registration with said window, and a pin on one of the gears of said gear train adapted to intermittently contact said arm so as to make an audible signal at the time of contact therewith and coincidently shift said shutter to momentarily locate said aperture in registration with said window.

IRVING CISSKI.
ABRAM SHAPIRO.

REFERENCES CITED

The following references are of record in the file of this patent:

UNITED STATES PATENTS

| Number | Name | Date |
|---|---|---|
| 1,437,152 | Roop | Nov. 28, 1922 |
| 1,787,271 | Hayden | Dec. 30, 1930 |
| 1,979,984 | Moomaw | Nov. 6, 1934 |
| 2,012,352 | Rusting et al. | Aug. 27, 1935 |
| 2,124,887 | Moomaw | July 26, 1938 |
| 2,249,975 | Nissen | July 22, 1941 |
| 2,343,015 | Lewis | Feb. 29, 1944 |

FOREIGN PATENTS

| Number | Country | Date |
|---|---|---|
| 733,611 | France | Oct. 8, 1932 |